US008988280B2

(12) United States Patent
Mosca et al.

(10) Patent No.: US 8,988,280 B2

(45) Date of Patent: Mar. 24, 2015

(54) CALIBRATION OF ACTIVE ELECTRONICALLY SCANNED ARRAY (AESA) ANTENNAS

(75) Inventors: Stefano Mosca, Rome (IT); Massimo Marchetti, Rome (IT)

(73) Assignee: Selex Sistemi Integrati S.p.A. (IT)

( * ) Notice: Subject to any disclaimer, the term of this patent is extended or adjusted under 35 U.S.C. 154(b) by 522 days.

(21) Appl. No.: 13/335,676

(22) Filed: Dec. 22, 2011

(65) Prior Publication Data

US 2012/0188116 A1 Jul. 26, 2012

(30) Foreign Application Priority Data

Dec. 22, 2010 (IT) .............................. TO2010A1039

(51) Int. Cl.

*G01S 7/40* (2006.01)
*H01Q 3/26* (2006.01)
*H01Q 21/06* (2006.01)

(52) U.S. Cl.

CPC ............ *H01Q 3/267* (2013.01); *H01Q 21/064* (2013.01)
USPC ............................ 342/165; 342/173; 342/174

(58) Field of Classification Search

CPC H01Q 3/267; H01Q 21/0025; H01Q 21/0037
USPC .................................... 342/81, 165, 173–174
See application file for complete search history.

(56) References Cited

U.S. PATENT DOCUMENTS

| | | | | |
|---|---|---|---|---|
| 4,176,354 | A * | 11/1979 | Hsiao et al. | 342/173 |
| 5,412,414 | A * | 5/1995 | Ast et al. | 342/174 |
| 5,959,506 | A * | 9/1999 | Aves | 333/33 |
| 6,208,287 | B1 * | 3/2001 | Sikina et al. | 342/174 |
| 6,794,962 | B2 * | 9/2004 | Chambelin et al. | 333/249 |
| 7,215,298 | B1 | 5/2007 | Fraschilla et al. | |
| 7,545,321 | B2 * | 6/2009 | Kawasaki | 342/368 |
| 2003/0142012 | A1 * | 7/2003 | Hirabe | 342/173 |
| 2008/0129613 | A1 | 6/2008 | Ermutlu | |
| 2009/0021440 | A1 * | 1/2009 | Forslund | 343/772 |
| 2010/0253570 | A1 * | 10/2010 | Scott | 342/173 |
| 2010/0253571 | A1 * | 10/2010 | Scott | 342/174 |
| 2011/0122016 | A1 * | 5/2011 | Lomes et al. | 342/174 |
| 2012/0154206 | A1 * | 6/2012 | Medina Sanchez | 342/174 |

* cited by examiner

*Primary Examiner* — John B Sotomayor
*Assistant Examiner* — Marcus Windrich
(74) *Attorney, Agent, or Firm* — The Belles Group, P.C.

(57) ABSTRACT

The present invention concerns an active electronically scanned array antenna comprising: an active array, configured for radiating/receiving radiofrequency signals through first radiating openings that lie on a ground plane; and a dielectric cover arranged at a given distance from the ground plane so that between said dielectric cover and said ground plane an air gap is present. Said active electronically scanned array antenna is characterized in that it further comprises one or more calibration devices operable for calibrating said active electronically scanned array antenna, each calibration device comprising a respective radiating portion arranged between the dielectric cover and the ground plane and configured for receiving radiofrequency signals radiated through corresponding first radiating openings and for radiating radiofrequency signals in the air gap towards said corresponding first radiating openings.

12 Claims, 6 Drawing Sheets

CALIBRATION OF ACTIVE ELECTRONICALLY SCANNED ARRAY (AESA) ANTENNAS

CROSS REFERENCE TO RELATED APPLICATIONS

This application claims priority under 35 U.S.C. §119 to Italian Patent Application No. TO2010A 001039, filed Dec. 22, 2010, the entirety of which is hereby incorporated by reference.

FIELD OF THE INVENTION

In general, the present invention relates to the calibration of active electronically scanned array (AESA) antennas.

In particular, the present invention relates to an AESA antenna that comprises a calibration device, specifically a calibration antenna, and to a method for calibrating an AESA antenna.

BACKGROUND OF THE INVENTION

As is known, an AESA antenna, to be able to function properly, requires a calibration system so that it can be calibrated, i.e., so that it can periodically adapt the phase and amplitude of the respective transmit/receive modules (TRMs) in such a way as to achieve the required radiating performance. In particular, in radar systems based upon AESA antennas the term "calibration" is used for describing the measurements and regulations made automatically by the radar systems on the TRMs, especially during start-up, to ensure the required radiating performance.

In this regard, illustrated in FIG. 1 is a block diagram representing a typical architecture of an AESA antenna designated as a whole by 1.

In particular, the AESA antenna 1 includes a beam-forming network or manifold 11, which comprises, at a first end, an input/output port 12 and is connected, at a second end, to a plurality of TRMs 13, each of which is connected to a corresponding radiating element 14.

In detail, the beam-forming network 11 enables:

- in transmission, propagation of radiofrequency (RF) signals from the input/output port 12 to the TRMs 13 so that said RF signals will be amplified and phase-shifted by said TRMs 13 and then transmitted by the radiating elements 14; and,
- in reception, propagation from the TRMs 13 to the input/output port 12 of RF signals received from the radiating elements 14 and amplified and phase-shifted by said TRMs 13.

Conveniently the input/output port 12 is connected to transceiving means (not illustrated in FIG. 1) of the AESA antenna 1, which are configured for:

- in reception, receiving and processing the RF signals received from the radiating elements 14, amplified and phase-shifted by said TRMs 13 and propagated through the beam-forming network 11 by the TRMs 13 up to the input/output port 12; and,
- in transmission, supplying at input on the input/output port 12 the RF signals that the AESA antenna 1 must transmit, which then propagate through the beam-forming network 11 from the input/output port 12 up to the TRMs 13, are amplified and phase-shifted by the TRMs 13, and finally, are transmitted by the radiating elements 14.

For an AESA antenna to achieve the required radiating performance, it is necessary for there to be for each path among all the elements of the array pre-defined relations of phase and amplitude. The insertion of phase and amplitude of each radiating element depends upon passive components (beam-forming networks, cables, etc.) and active components (TRMs). The aim of the calibration is to regulate the amplification, specifically via a variable attenuator, and the phase of each TRM to obtain the desired distribution of phase and amplitude on the face, i.e., on the surface, of the active array.

Normally, the calibration must be repeated periodically because ageing and/or variations in temperature cause variations in the insertion of phase and amplitude of the TRMs.

In order to carry out calibration, an AESA antenna must be equipped with a calibration system, i.e., additional hardware and software elements that will enable the AESA antenna to measure and regulate insertion of phase and amplitude of each RF path that comprises a TRM (in AESA antennas usually each radiating element is coupled to a respective TRM).

In particular, as regards calibration of an AESA antenna by means of a calibration system it must be possible to inject an RF signal in each RF path of the AESA antenna that comprises a TRM and to measure said RF signal after the TRM, i.e., to measure the amplitude and phase of the RF signals that propagate in each RF path that includes a TRM. Moreover, when the injected RF signal is measured, said RF signal must have a signal-to-noise ratio (SNR) as high as possible so as to obtain accurate measurements.

For example, according to the U.S. patent application No. US2004032365 (A1), in order to calibrate an AESA antenna, an RF signal can be injected using a supplementary RF network that injects the RF signal on each path of the AESA antenna through a coupler, or else using different external antennas to inject the RF signal directly into each radiating element. This second solution requires an amount of additional hardware elements smaller than the first solution, but requires positioning of external antennas outside the structure of the AESA antenna, thus increasing the overall dimensions thereof. This is a disadvantage above all for AESA antennas used in transportable radar systems, where the external dimensions of the AESA antennas must be as small as possible, albeit compatible with the requirements of the antenna (beam aperture, gain, etc.).

BRIEF SUMMARY OF THE INVENTION

The aim of the present invention is hence to provide a device and a method for calibrating an active-array antenna that, in general, will enable mitigation, at least in part, of the disadvantages of known calibration devices and methods and that, in particular, will not entail an increase in the external dimensions of the active-array antenna.

The aforesaid aim is achieved by the present invention in so far as it regards an active electronically scanned array antenna, a radar system comprising said active electronically scanned array antenna, a method for calibrating an active electronically scanned array antenna, and a software program for implementing said calibration method, according to what is defined in the annexed claims.

BRIEF DESCRIPTION OF THE DRAWINGS

For a better understanding of the present invention, some preferred embodiments, provided purely by way of explanatory and non-limiting example, will now be illustrated with reference to the annexed drawings (not in scale), wherein.

DETAILED DESCRIPTION OF THE INVENTION

The following description of the preferred embodiment(s) is merely exemplary in nature and is in no way intended to limit the invention, its application, or uses.

The present invention will now be described in detail with reference to the attached figures to enable a person skilled in the branch to reproduce it and use it. Various modifications to the embodiments described will be immediately evident to persons skilled in the branch, and the generic principles described can be applied to other embodiments and applications without thereby departing from the sphere of protection of the present invention, as defined in the annexed claims. Consequently, the present invention is not to be considered limited to the embodiments described and illustrated, but it must be granted the widest sphere of protection in conformance with the principles and characteristics described and claimed herein.

Furthermore, the present invention is implemented also by means of a software program comprising portions of code designed to implement, when the software program is loaded into the memory of a processing and control unit of an active electronically scanned array antenna according to the present invention and executed by said processing and control unit, the calibration method that will be described in what follows.

For reasons of simplicity of description and without this implying any loss of generality, in what follows the calibration of an AESA antenna will be described principally in relation to operation of the AESA antenna in reception, it remaining understood that the same principles and concepts that will be described in what follows can be applied, *mutatis nuitandis*, also to operation of the AESA antenna in transmission by simply reversing the direction of the RF signals considered.

According to a first aspect of the present invention, described hereinafter is, in general, a calibration device for calibrating active-array antennas and, in particular, a calibration antenna for calibrating active waveguide arrays arranged on a ground plane and covered with a dielectric cover that acts both as wide-angle impedance matcher (WAIM) and as protection from the surrounding environment. In order to perform the WAIM function, the dielectric cover is usually positioned at distances of approximately λ/10 from the ground plane of the active array, where λ is the operating wavelength of the active-array antenna. Consequently, between the dielectric cover and the ground plane of the active-array antenna an air gap is present. The calibration antenna according to the present invention has dimensions such as to enable it to be positioned within said air gap between the ground plane and the dielectric cover of the active-array antenna, and is configured to inject into the radiating elements of the active-array antenna RF signals which have an SNR sufficient for carrying out accurate calibration measurements.

Figure 2:
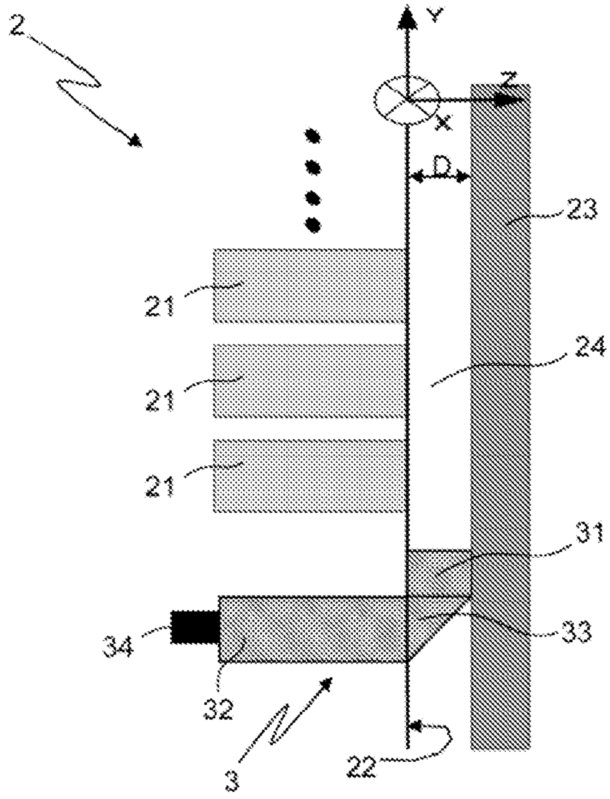
FIG. 2 is a schematic view of a cross section of a first portion of an active electronically scanned array antenna according to a preferred embodiment of the present invention.

In this regard, illustrated schematically in FIG. 2 is a cross section of a first portion of an AESA antenna according to a preferred, embodiment of the present invention, said AESA antenna being designated as a whole by 2 in FIG. 2.

In particular, as illustrated in FIG. 2, the AESA antenna 2 comprises an active array of waveguide radiating elements 21, in each of which there propagate, parallel to a first direction Z, RF signals that the AESA antenna 2 must transmit/receive in use. Each radiating element 21 is coupled, at one end, to a corresponding TRM (not illustrated in FIG. 2) and terminates, at the other end, with a radiating opening (not illustrated in FIG. 2) that lies on a ground plane 22 of the AESA antenna 2 and has two first sides oriented parallel to a second direction Y perpendicular to the first direction Z and two second, sides oriented parallel to a third direction X perpendicular to the first direction Z and to the second direction Y. The ground plane 22 extends in the second direction Y and in the third direction X; namely, the ground plane 22 is orthogonal to the first direction Z.

Moreover, as described previously, the AESA antenna 2 also comprises a dielectric cover 23 parallel to the ground plane 22 and positioned at a given distance D from said ground plane 22 so that between said dielectric cover 23 and said ground plane 22 an air gap 24 is present.

Preferably, the dielectric cover 23 comprises a multilayer structure made of one or more dielectric materials.

Conveniently, the given distance D is equal to λ/10, where λ is the operating wavelength of the AESA antenna 2. Once again as described previously, the dielectric cover 23 operates both as wide-angle impedance matcher (WHIM) and as protection of the AESA antenna 2 from the surrounding environment.

With reference once again to FIG. 2, the AESA antenna 2 comprises a calibration device, or calibration antenna, 3 that includes a waveguide radiating portion 31 that is comprised between the ground plane 22 and the dielectric cover 23 of the AESA antenna 2 and where RF signals that the calibration antenna 3 must radiate/receive in use propagate parallel to the second direction Y.

In particular, the radiating portion 31 of the calibration antenna 3 terminates, at a first end, with a radiating opening (not illustrated in FIG. 2) that gives out onto the air gap 24 comprised between the dielectric cover 23 and the ground plane 22 of the AESA antenna 2, specifically towards the radiating openings of the radiating elements 21 of the AESA antenna 2, and has two first sides oriented parallel to the first direction Z and two second sides oriented parallel to the third direction X.

In detail, the radiating portion 31 has a pre-defined dimension in the first direction Z, between the ground plane 22 and the dielectric cover 23 of the AESA antenna 2, which is smaller than or equal to the given distance D.

Moreover, once again as illustrated in FIG. 2, the calibration antenna 3 also includes:

a waveguide transition portion 32, where the RF signals that the calibration antenna 3 must radiate/receive in use propagate parallel to the first direction Z; and a waveguide middle portion 33, which is comprised between the radiating portion 31 and the transition portion 32 and where the RF signals that the calibration antenna 3 must radiate/receive in use propagate from/to the transition portion 32 to/from the radiating portion 31.

In particular, the transition portion 32 is connected, at a first end, to an SMA coaxial connector 34 and, at a second end, to one end of the middle portion 33, which, is in turn connected, at the other end, to a second end of the radiating portion 31.

In use, the calibration antenna 3 radiates, by means of the radiating opening of the radiating portion 31, an RF signal on the periphery of the active array parallel to the ground plane 22. Then the RF signal radiated propagates as a surface wave on the ground plane 22 of the AESA antenna 2, i.e., on the face of the active array. The propagation of said surface wave on the ground plane 22, i.e., on the surface of the active array, is facilitated by the presence of the dielectric cover 23.

In particular, the calibration antenna 3 is a truncated-waveguide antenna, the radiating portion 31 of which has the pre-defined dimension in the first direction Z that is very small so that it can be inserted in the air gap 24 and is configured for radiating principally in a direction parallel to the ground plane 22 towards the radiating openings of the radiating elements 21. In fact, as described previously, the radiating opening, of the radiating portion 31 of the calibration antenna 3 gives out towards the radiating openings of the radiating elements 21.

Figure 3:
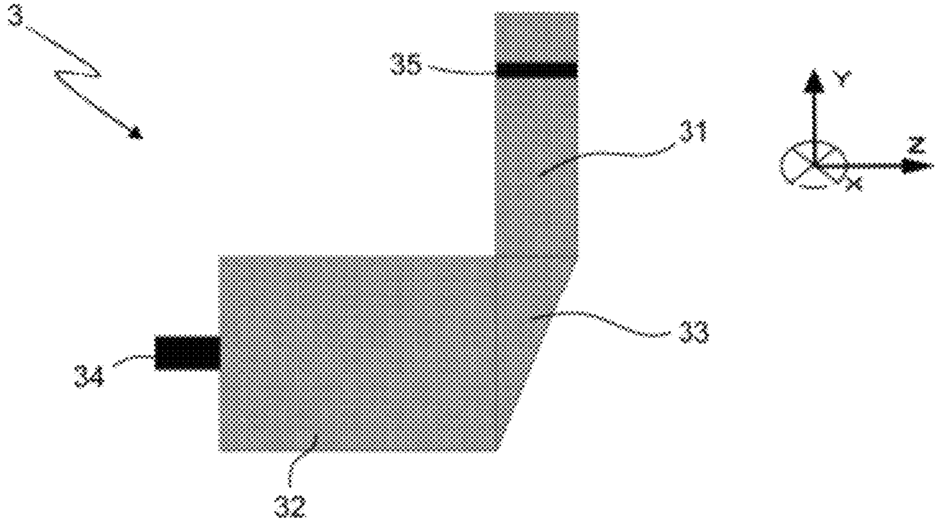
FIG. 3 is a schematic view of a cross section of an antenna for calibration of the active electronically scanned array antenna of FIG. 2.
Figure 4:
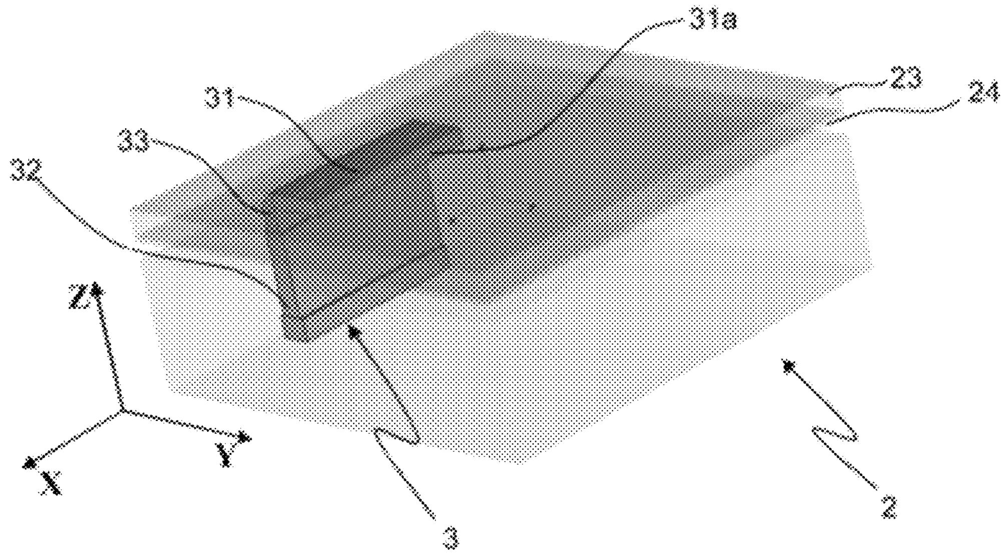
FIG. 4 is a schematic perspective view of a second portion of the active electronically scanned array antenna of FIG. 2.
Figure 5:
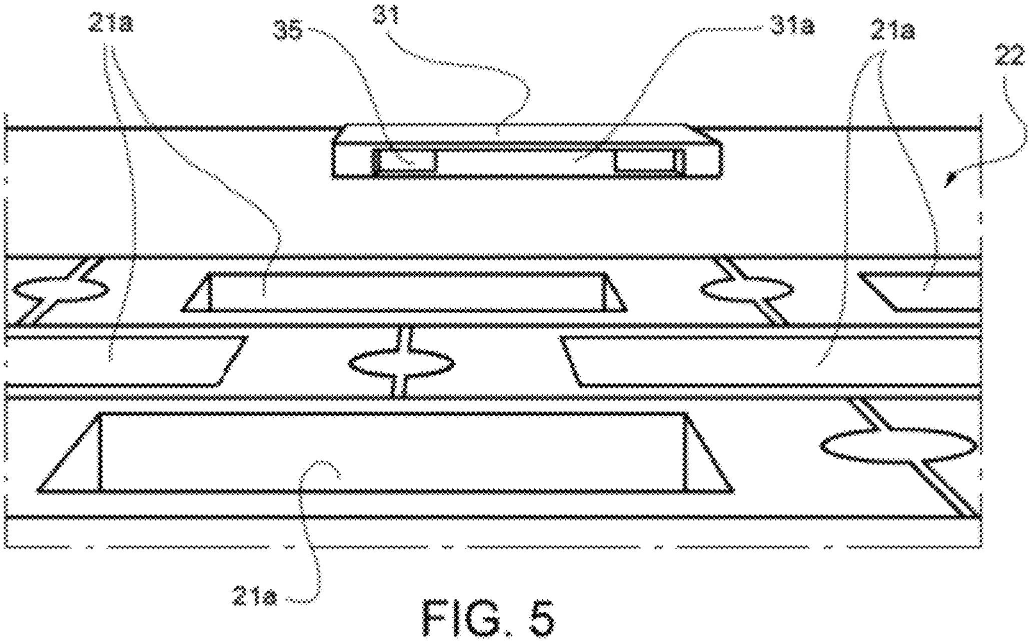
FIG. 5 is a perspective view of a third portion of the active electronically scanned array antenna of FIGS. 2 and 4.

Moreover, for a better understanding of the present invention,

- illustrated in FIG. 3 is a schematic view of a cross section of just the calibration antenna 3;
- illustrated in FIG. 4 is a schematic perspective view of the calibration antenna 3 and in transparency, for greater clarity of illustration, of a second portion of the AESA antenna 2; and
- illustrated in FIG. 5 is a perspective view of the calibration antenna 3 and of a third portion of the AESA antenna 2 without; for greater clarity of illustration, the dielectric cover 23.

In FIGS. 3-5, the components of the AESA antenna 2 and of the calibration antenna 3 already illustrated in FIG. 2 and described previously are identified by the same reference numbers as the ones already used in FIG. 2.

In particular, as described previously and as illustrated in FIGS. 2-5, the calibration antenna 3 comprises three main portions cascaded to one another: the radiating portion 31, the Middle portion 33, which has a 90° curve, and the transition portion 32.

In detail, the radiating portion 31 is inserted in the air gap 24 of the AESA antenna 2, is responsible for radiation towards the radiating elements 21 of the AESA antenna 2 and can be conveniently made with an ultra-low-profile (ULP) waveguide that has a first dimension in the first direction Z (which, in what follows, will be called, for reasons of simplicity of description, height H) equal to 3.5 mm (i.e., H=3.5 mm).

Going into, even greater detail, the waveguide with which the radiating portion 31 is made can conveniently have a second dimension in the third direction X (which, in what follows will be called, for reasons of simplicity of description, width W) equal to 40.4 mm (i.e., W=40.4 mm).

Moreover, the middle portion 33 can be conveniently made with a ULP waveguide curved at 90° that connects the waveguide of the radiating portion 31 with the waveguide of the transition portion 32. To optimize matching of the curve, the latter can be conveniently rounded off.

In addition, the transition portion 32, which is connected via the SMA coaxial connector 34 to an external signal source (not illustrated in any of FIGS. 2-5) for receiving from the latter the RF signal to be radiated, performs, in the propagation within the calibration antenna 3 of the RF signal to be radiated, a first propagation-support transition from coaxial to waveguide and, cascaded thereto, a second propagation-support transition from low-profile (LP) waveguide, for example having a height of 6.5 mm and a width of 40.4 mm, to ultra-low-profile (ULP) waveguide.

In particular, the purpose is here to point out how the width of the waveguide of the calibration antenna 3, for example 40.4 mm, depends upon the operating frequency of the calibration antenna 3, i.e., upon the frequency of the RF signals that the calibration antenna 3 must radiate/receive in use. Consequently, once said operating frequency has been defined, also the width of the waveguide is defined and hence cannot be varied. Instead, the height of the waveguide of the calibration antenna 3, in particular the height of the waveguide of the radiating portion 31, does not affect the operating frequency of the calibration antenna 3 and can, hence, be reduced for reasons of overall dimensions. In particular, it can be small so that the radiating portion 31 can be inserted in the air gap 24 between the dielectric cover 23 and the ground plane 22 of the AESA antenna 2.

In addition, in order to match the radiation impedance of the radiating opening of the radiating portion 31 to the impedance of the waveguide of the radiating portion 31 so as to minimize the reflection coefficient, an inductive iris or septum 35 is used inserted in the radiating portion 31. Said inductive iris 35 behaves like an inductance in parallel that compensates the capacitive behaviour of the radiating opening of the radiating portion 31, said radiating opening being designated by 31 a in FIGS. 4 and 5.

In particular, said inductive septum 35 enables the calibration antenna 3 to function between the dielectric cover 23 and the active array by matching the impedance of the radiating opening 31*a* with that of the waveguide of the radiating portion of 31. In this way, the calibration antenna 3 can radiate surface waves on the surface, i.e., on the ground plane 22, of the active array of the AESA antenna 2.

On the other hand, in order to align, i.e., match, as much as possible the polarization of the calibration antenna 3 with that of the waveguide radiating elements 21 of the AESA antenna 2, the calibration antenna 3 is positioned so that the plane E of the radiating portion 31 is parallel to the plane E of the radiating elements 21. In this way, in fact, the calibration antenna 3 is able to receive the RF signals transmitted by the AESA antenna 2, and the AESA antenna 2 is able to receive the RF signals radiated by the calibration antenna 3.

In particular, as is known, the plane E of an antenna that transmits/receives polarized RF signals is represented by the plane containing the electric-field vector $\overline{E}$ of the RF signals transmitted/received. In other words, the plane E identifies the polarization or orientation of the radio waves transmitted/received by the antenna. In the case of the AESA antenna 2 the polarization of the RF signals transmitted/received is oriented in the second direction Y, and hence the plane E is oriented parallel to the second direction Y. All this implies that the second sides the sides oriented parallel to the third direction X) of the radiating opening 31*a* of the radiating portion 31 are parallel to the second sides of the radiating openings (designated by 21*a* in FIG. 5) of the radiating elements 21, which, in fact, as described previously, are also oriented parallel to the third direction X.

Moreover, the radiating opening 31*a* of the radiating portion 31 of the calibration antenna 3 has an radiation diagram the maximum of which is in the direction orthogonal to the radiating opening 31*a*, i.e., in the second direction Y. This implies that the insertion loss between the calibration antenna 3 and the radiating elements 21 of the AESA antenna 2 is low for the radiating elements 21 arranged in front of the radiating opening 31*a* of the radiating portion 31 of the calibration antenna 3 and is higher for the radiating elements 21 that are not in front of the radiating opening 31*a* of the radiating portion 31 of the calibration antenna 3.

In addition, the insertion loss is proportional to the distance between the radiating opening 31*a* of the radiating portion 31 of the calibration antenna 3 and the radiating openings 21*a* of the radiating elements 21 of the AESA antenna 2.

Preferably, in order to keep the insertion loss as constant as possible in all the radiating elements 21 of the AESA antenna 2, in particular in order to keep the insertion loss in each radiating element 21 comprised between a minimum value and a maximum value, a plurality of calibration antennas 3 arranged on the ground plane 22 of the AESA antenna 2 can be used so that each calibration antenna 3 is designed to radiate/receive RF signals towards/from respective radiating elements 21 of the AESA antenna 2.

Figure 6:
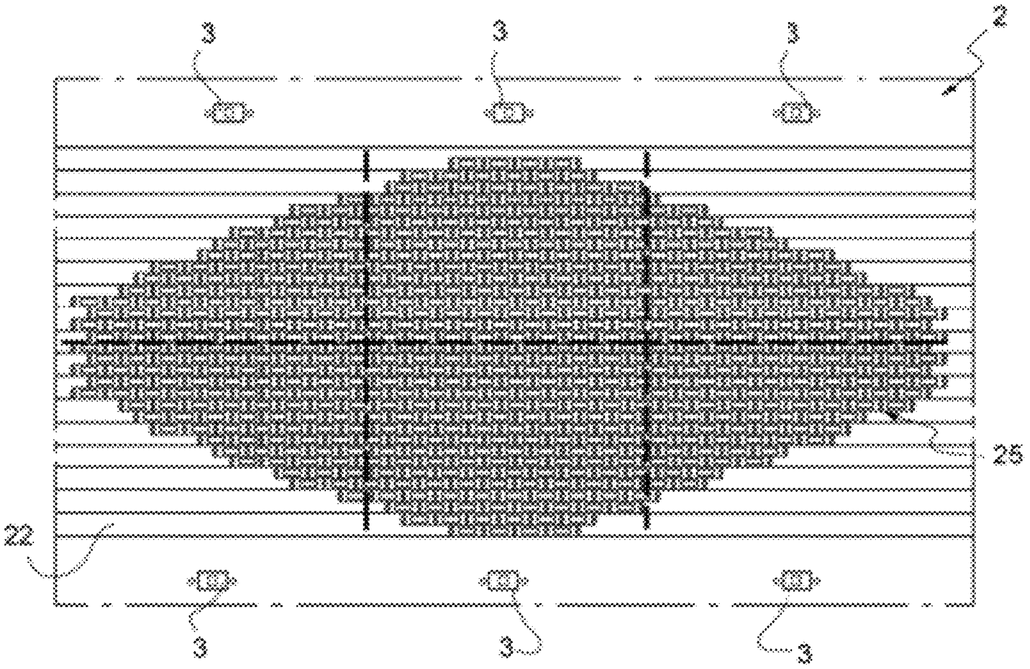
FIG. 6 is a front view of the entire active electronically scanned array antenna partially illustrated in FIGS. 2, 4 and 5.

In this regard, FIG. 6 illustrates a front view of the entire AESA antenna 2 without the dielectric cover 23, for greater clarity of illustration.

In particular, as illustrated in FIG. 6, the entire. AESA antenna 2 comprises an active array 25 that has the radiating elements 21 set in sixteen rows and fifty-four columns, each of the radiating elements 21 being coupled to a corresponding TRM (not illustrated in FIG. 6).

Moreover, installed on the ground plane 22 of the AESA antenna 2, in particular outside the area of the ground plane 22 occupied by the active array 25, are six calibration antennas 3, three of which are positioned along a first side of the active array 25 and three of which are positioned along a second side of the active array 25 opposite to the first side. Each calibration antenna 3 is used for radiating/receiving RF signals towards/from a corresponding region of the active array 25, in particular each calibration antenna 3 is used for radiating/receiving RF signals towards/from the radiating elements 21 that are closest to said calibration antenna 3.

Figure 7:
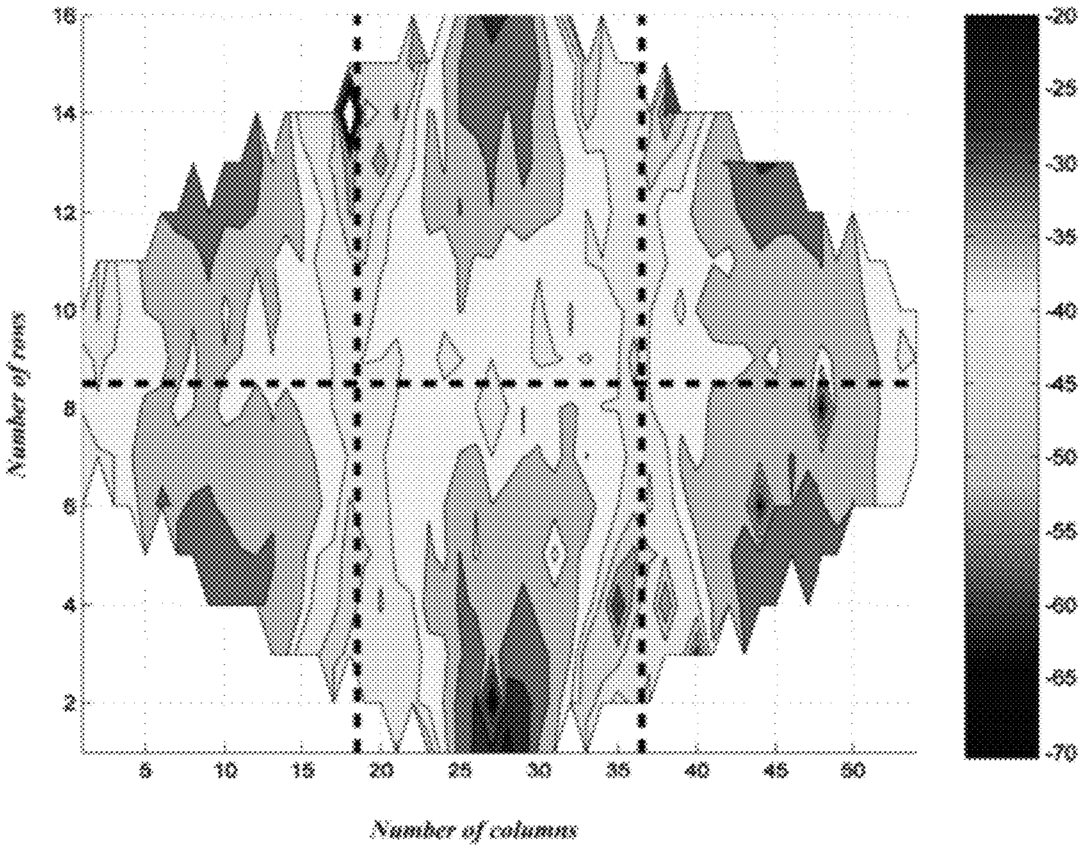
FIG. 7 is a schematic illustration of measurements of insertion amplitude between radiating elements of the active electronically scanned array antenna and six calibration antennas illustrated in FIG. 6.

Conveniently, as represented by dashed lines in FIG. 6, the regions of the active array 25 corresponding, for the calibration, to the six calibration antennas 3 can be rectangular and have dimensions of eight rows by eighteen columns. With said arrangement, it is possible to maintain the insertion loss measured between the calibration antennas 3 and the radiating elements 21 between −20 dB and −50 dB, as represented in the graph appearing in FIG. 7. More precisely, each calibration antenna 3 is used for transmitting/receiving towards/from the radiating elements 21 positioned in the dashed rectangle in FIG. 6 immediately in front. In particular, represented in the graph of FIG. 7 are measurements of the insertion amplitude (in dB) between the six calibration antennas 3 and the radiating elements 21 of the active array 25. In accordance with what is illustrated in FIG. 6, also in FIG. 7 the regions of the active array 25 corresponding, for the calibration, to the six calibration antennas 3 are identified by dashed lines.

According to a second aspect of the present invention, described, instead, hereinafter is a method for calibration of an active electronically scanned array antenna.

Figure 8:
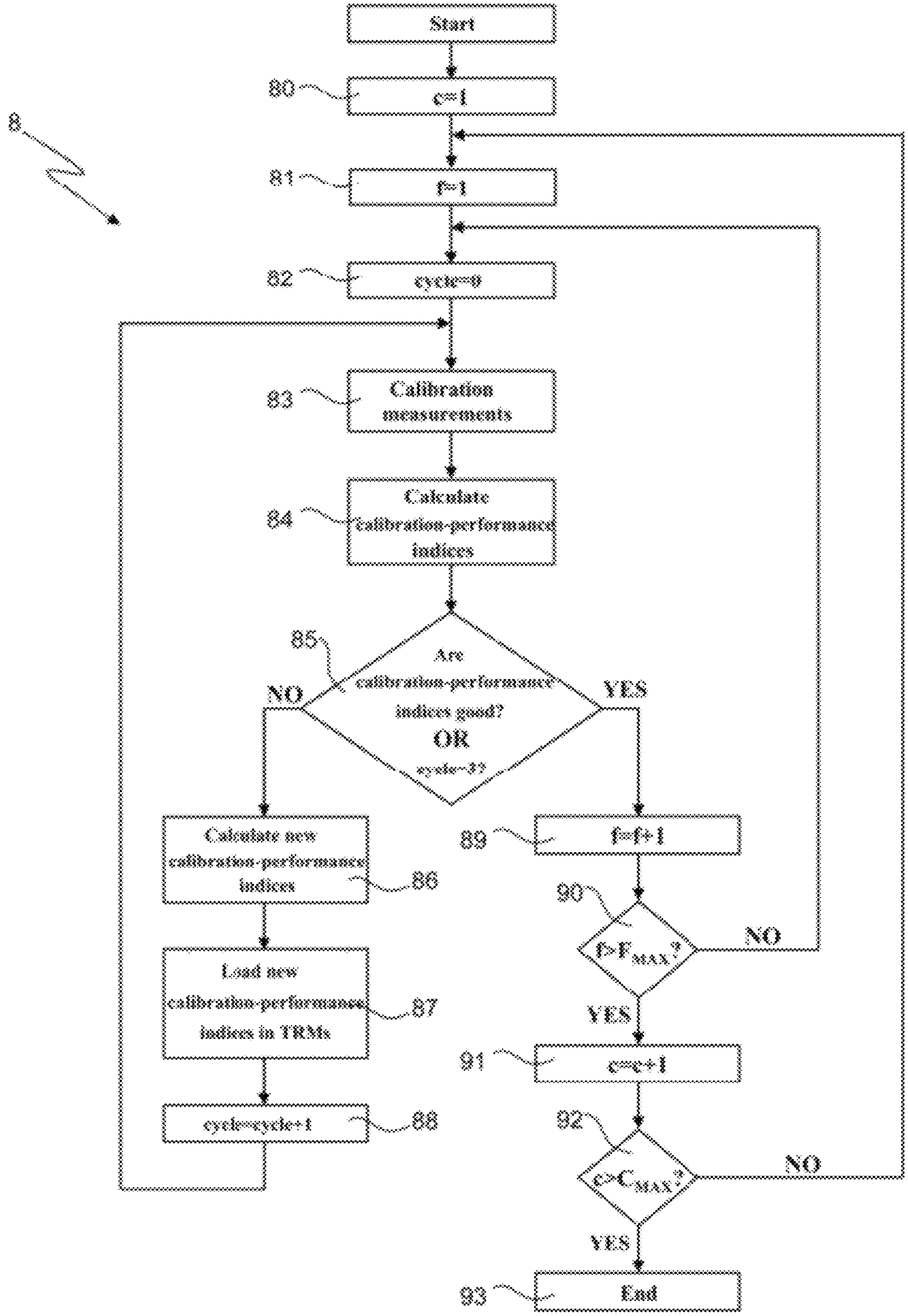
FIG. 8 is a schematic illustration of a method for calibration of an active electronically scanned array antenna according to a preferred embodiment of the present invention.

In particular, in this regard, FIG. 8 shows a flowchart representing a calibration method 8 according to a preferred embodiment of the present invention designed to be used for calibrating an AESA antenna by using the calibration device according to the present invention.

In particular, for reasons of simplicity of description and without this implying any loss of generality, in what follows the calibration method 8 will be described in relation to calibration of the AESA antenna 2, illustrated in FIG. 6 and described previously, by using the six calibration antennas 3, which have also been described previously.

Moreover, as has already been said previously, once again for reasons of simplicity of description and without this implying any loss of generality, in what follows the calibration method 8 will be described only in relation to the operation in reception of the AESA antenna 2, it remaining understood that the same principles and concepts that will be described in what follows can be applied, mutatis mutandis, also for operation in transmission of the AESA antenna 2 by simply reversing the direction of the RF signals considered.

According to what is illustrated in FIG. 8, the calibration method 8 principally comprises a measuring step (block 83) where calibration measurements are executed, and a plurality of processing steps based upon the calibration measurements made.

In particular, during the measuring step (block 83) the insertion of phase and amplitude of each TRM of the AESA antenna 2 is measured, while during the processing steps the quantities determined during the measuring step (block 83) are processed so as to calculate phase and amplitude calibration coefficients to be loaded into the TRMs in order to obtain a desired distribution of phase and amplitude on the face of the active array 25 of the AESA antenna 2.

Figure 1:
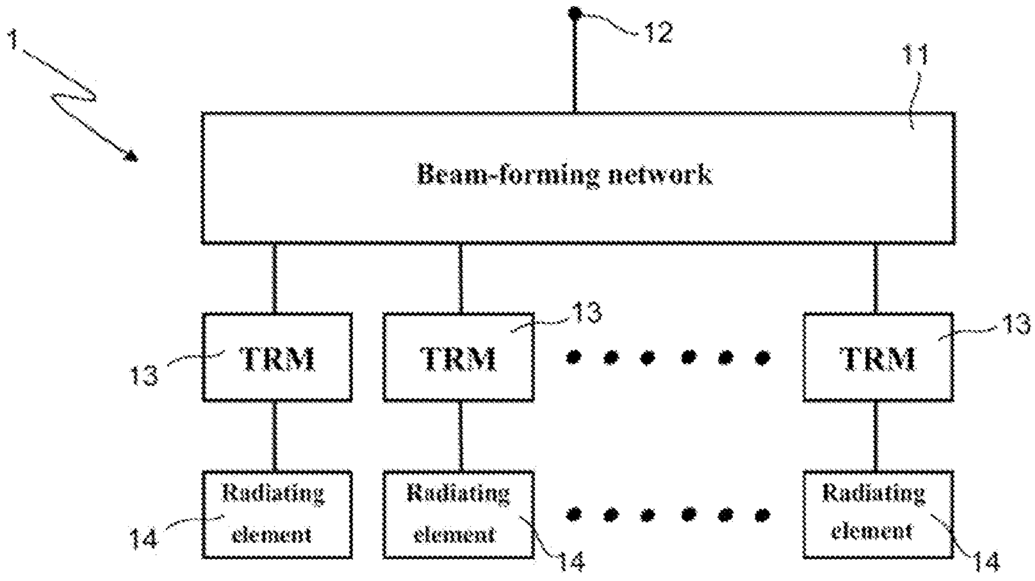
FIG. 1 (PRIOR ART)
FIG. 1 is a schematic illustration of a typical architecture of an active electronically scanned array antenna.

In detail, the purpose of calibration of the TRMs of the AESA antenna 2 is to correct the variations of amplitude and phase on each reception/transmission path within the entire active array 25. By "reception/transmission path" is meant an RF path between a radiating element 21 and the input of the transceiving means of the AESA antenna 2. A reception/transmission path generally includes a TRM, the beam-forming network of the AESA antenna 2, etc. Specifically, with reference once again for a moment to FIG. 1, a reception/transmission path is comprised between the input/output port 12 and a radiating element 14.

In order to obtain the desired distribution of phase and amplitude on the face of the active array 25 of the AESA antenna 2, the purpose of the calibration of the TRMs, each of which is equipped with a respective digital attenuator and a respective digital phase shifter, is to set:

- the digital attenuators in the TRMs to respective specific attenuation coefficients such as to guarantee the desired distribution of amplitude on the face of the active array 25 of the AESA antenna 2; and
- the digital phase shifters in the TRMs to respective specific phase coefficients such as to guarantee that the phase of each reception/transmission path is equal to a reference phase value.

Entering into the detail of the description of the calibration method 8 and with reference to FIG. 8, said calibration method 8 comprises performing a complete calibration of the TRMs of the AESA antenna 2 for each shape of the RF beam that the AESA antenna 2 must transmit/receive. Corresponding to each shape of the RF beam is a respective distribution of amplitude and phase on the face of the active array 25 of the AESA antenna 2. As illustrated in FIG. 8, associated to the shapes of RF beam is an RF-beam index c that for each RF-beam shape assumes a corresponding value comprised between 1 and $C_{MAX}$, i.e., using a mathematical formalism, $1 \leq c \leq C_{MAX}$, where $C_{MAX}$ is the number of shapes of RF beam that can be transmitted/received by the AESA antenna 2.

In addition, the AESA antenna 2 can transmit/receive RF signals at different frequencies and, as illustrated in FIG. 8, associated to the frequencies is a frequency index f that for each frequency assumes a corresponding value comprised between 1 and $F_{MAX}$, i.e., using a mathematical formalism, $1 \le f \le F_{MAX}$, where $F_{MAX}$ is the number of operating frequencies of the AESA antenna 2. In particular, for each RF-beam shape the calibration is performed one frequency at a time.

In accordance with what is illustrated in FIG. 8, after selecting the RF-beam shape and the frequency, all the measurements (block 83) are performed to gather data regarding the TRMs in order to evaluate whether a new calibration is necessary. The data regarding the TRMs are gathered, i.e., measured, using the current calibration, i.e., using the current calibration coefficients. In particular, when, the AESA antenna 2 is calibrated for the first time, the current calibration corresponds to the non-calibrated AESA antenna 2, i.e., all the attenuation coefficients of the digital attenuators of the TRMs and all the phase coefficients of the digital phase shifters of the TRMs are set to initial default values. Preferably, the measuring step (block 83) comprises processing the quantities measured in such a way as to eliminate any contribution of background radiation.

Next, the data regarding the TRMs are used for evaluating whether the current calibration is still acceptable or not (block 85). To be able to evaluate whether the current calibration is still acceptable or not, calibration-performance indices are calculated (block 84), which comprise a performance index for the amplitude and a performance index for the phase. The calibration-performance indices calculated are compared with reference performance indices so as to evaluate whether the current calibration is acceptable or not (block 85).

Then, if the current calibration is not acceptable, new calibration coefficients are calculated (block 86), which are then loaded in the TRMs (block 87) so that the subsequent calibration measurements (block 83) are made on the basis of the new calibration coefficients calculated. In particular, the new calibration coefficients calculated are used for setting new values of the attenuation coefficients of the digital attenuators of the TRMs and of the phase coefficients of the digital phase shifters of the TRMs (block 87).

Finally, if for a given frequency and a given RF-beam shape new calibration coefficients are Calculated for more than three times without obtaining acceptable calibration-performance indices, the operations are repeated for the next frequency (block 89) and/or the next RF-beam shape (block 91). This error in calibration can be conveniently referred to as "built-in-test" (BIT) information. Preferably, a processing-cycle index cycle is used for counting the number of times the calibration coefficients have been calculated for each frequency and RF-beam shape.

In even greater detail, as illustrated in FIG. 8, the calibration method 8 comprises:

- selecting a first RF-beam shape assigning to the RF-beam index c the value one (i.e., setting c=1) that is precisely associated to the first RF-beam shape (block 80);
- selecting a first frequency assigning to the frequency index f the value one (i.e., setting f=1) that is precisely associated to the first frequency (block 81);
- assigning to the processing-cycle index cycle an initial value equal to zero (i.e., setting cycle=0) (block 82);
- performing the calibration measurements using the six calibration antennas 3 (block 83);
- calculating the calibration-performance indices on the basis of the calibration measurements made (block 84); and
- checking whether the calibration-performance indices calculated satisfy a predefined condition with respect to reference performance indices and whether the processing-cycle index cycle is equal to three (i.e., checking whether cycle=3) (block 85).

Then, if the calibration-performance, indices calculated do not satisfy a predefined condition with respect to the reference performance indices, and the processing-cycle index cycle is not equal to three (in particular cycle<3), then the calibration method 8 comprises:

- calculating new calibration coefficients (block 86);
- loading the new calibration coefficients calculated into the TRMs (block 87);
- incrementing by one the processing-cycle index cycle (i.e., setting cycle=cycle+1) (block 88); and
- repeating part of the calibration method 8 starting again with execution of the calibration measurements (block 83).

Instead, if the calibration-performance indices calculated satisfy a predefined condition with respect to the reference performance indices or else if the processing-cycle index cycle is equal to three (i.e., if cycle=3), then the calibration method 8 comprises:

- incrementing by one the frequency index f (i.e., imposing f=f+1) (block 89); and
- checking whether the frequency index f is higher than $F_{MAX}$ (i.e., checking whether $f > F_{MAX}$) (block 90).

Then, if the frequency index f is not higher than $F_{MAX}$ (i.e., if $f \le F_{MAX}$), part of the calibration method 8 is repeated starting again with assignment to the processing-cycle index cycle of the initial value equal to zero (i.e., setting again cycle=0) (block 82).

Instead, if the frequency index f is higher than $F_{MAX}$ (i.e., if $f > F_{MAX}$), the calibration method 8 comprises:

- incrementing by one the RF-beam index c (i.e., setting c=c+1) (block 91); and
- checking whether the RF-beam index c is higher than $C_{MAX}$ (i.e., checking whether $c > C_{MAX}$) (block 92).

Then, if the RF-beam index c is not higher than $C_{MAX}$ (i.e., if $c \le C_{MAX}$), part of the calibration method 8 is repeated starting again with assignment to the frequency index f of the value 1 (block 81).

Instead, if the RF-beam index c is higher than $C_{MAX}$ (i.e., if $c > C_{MAX}$), the calibration terminates (block 93).

There now follows a detailed description of the main steps of the calibration method 8, i.e., the measuring step (block 83), the step of calculation of the calibration-performance indices (block 84), and the step of calculation of the new calibration index (block 86), with explicit reference, for reasons of simplicity of description and without this implying any loss of generality, to the AESA antenna 2 and to the six calibration antennas 3 illustrated in FIG. 6 and described previously.

In particular, the measuring step (block 83) comprises:

- activating in transmission one of the six calibration antennas 3, turning on just one TRM at a time of the M×N TRMs of the AESA antenna 2, where, with reference to what has been described previously in relation to FIG. 6, M=16 and N=54, and obtaining, on the basis of the corresponding signal received by the transceiver means of the AESA antenna 2, a corresponding measured signal $x_{m,n,f,c}^{MIS}$ having an in-phase component $I_{m,n,f,c}^{MIS}$ and a quadrature component $Q_{m,n,f,c}^{MIS}$, where the subscripts f and c indicate, respectively, the frequency and the RF-beam shape considered, and the pair of subscripts (m,n) identifies the TRM turned on (with $1 \le m \le M$ and $1 \le n \le N$); specifically of the six calibration antennas 3 the one corresponding to the region of the active array 25 that comprises the radiating element 21 coupled to the TRM (m,n) turned on is activated in transmission; and turning off all the TRMs of the AESA antenna 2, setting to the maximum attenuation the digital attenuators of all the TRMs of the AESA antenna 2, activating in transmission just one calibration antenna 3 at a time and obtaining, on the basis of the corresponding signal received by the transceiver means of the AESA antenna 2, a corresponding background signal $x_{p,f,c}^{BACK}$ having an in-phase component $I_{p,f,c}^{BACK}$ and a quadrature component $Q_{p,f,c}^{BACK}$, where the subscript p identifies the calibration antenna 3 activated in transmission with $1 \le p \le 6$).

The background signal $x_{p,f,c}^{BACK}$ is the signal received by the transceiver means of the AESA antenna 2 when the p-th calibration antenna 3 injects a signal and all the TRMs of the AESA antenna 2 are turned off. If the insulation of each TRM were infinite, the background signal $x_{p,f,c}^{BACK}$ would be negligible, but since said insulation is not infinite, then the background signal $x_{p,f,c}^{BACK}$ is the vector sum of the contributions of all TRMs turned off, namely, $$x_{p,f,c}^{BACK} = \sum_{m=1}^{M} \sum_{n=1}^{N} x_{m,n,p,f,c}^{OFF}$$

When just one TRM is turned on, the measured signal $x_{m_0,n_0,f,c}^{MIS}$, is the sum of the small signals through all the TRMs turned off plus the signal through the TRM turned on $x_{m_0,n_0,f,c}^{on}$, namely, $$x_{m_0,n_0,f,c}^{MIS} = x_{m_0,n_0,f,c}^{ON} + \sum_{m=1}^{M} \sum_{\substack{n=1 \\ m,n \ne m_0,n_0}}^{N} x_{m,n,p,f,c}^{OFF} \cong x_{m_0,n_0,f,c}^{ON} + x_{p,f,c}^{BACK},$$

where the pair of subscripts $(m_0, n_0)$ identifies the TRM turned on.

Figure 9:
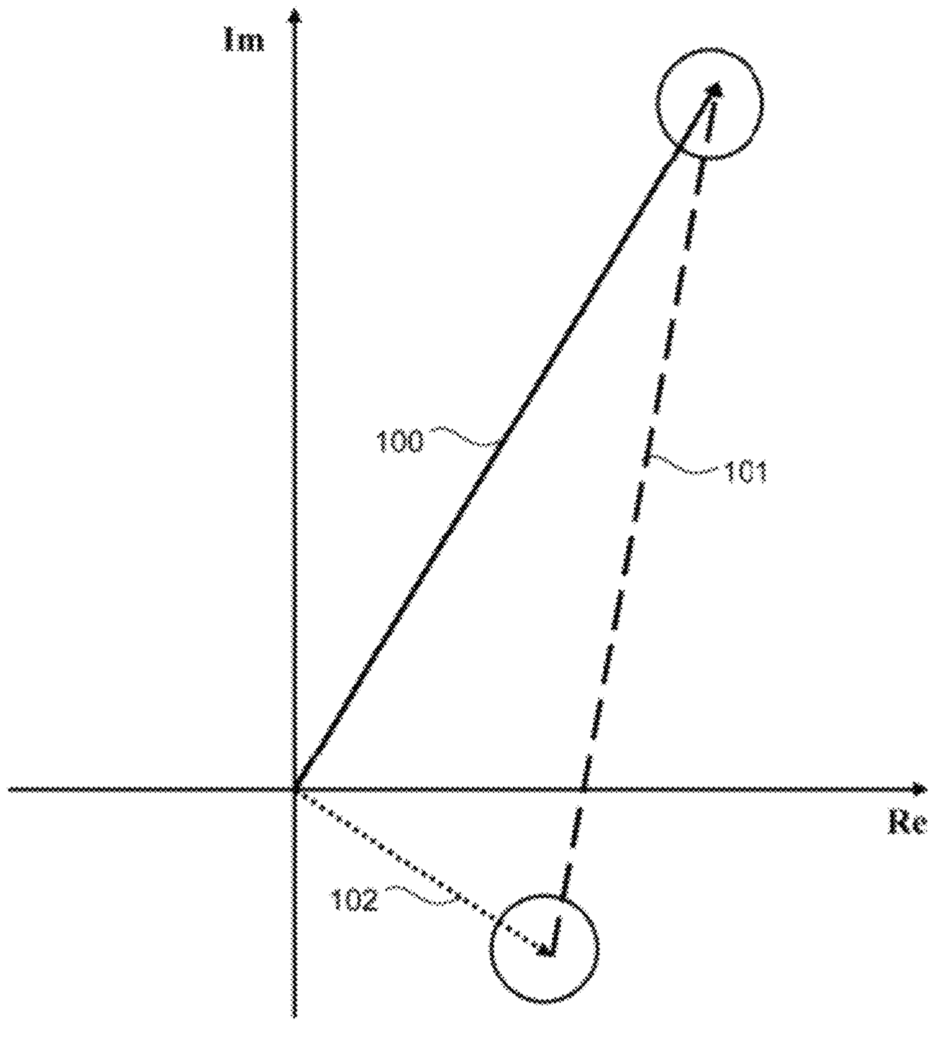
FIG. 9 is a schematic illustration of a signal obtained during a step of the calibration method of FIG. 8.

For a better understanding of the measuring step (83), illustrated in FIG. 9 in the complex plane is a complex vector 100 corresponding to the signal measured $x_{m_0,n_0,f,c}^{MIS}$ (represented by a solid line) that can be decomposed into in a first component 101 corresponding to the signal through the TRM turned on $x_{m_0,n_0,f,c}^{ON}$ (represented by a dashed line) and a second component 102 corresponding to the background signal $x_{p,f,c}^{BACK}$ (represented by a dotted line). In FIG. 9 two circles represent the uncertainty of the measurement, linked to the signal-to-noise ratio (SNR).

Consequently, to obtain only the contribution of the TRM turned on (i.e., the first component 101 represented in FIG. 9), the background signal must be subtracted from the measurement; namely, $$x_{m_0,n_0,f,c}^{ON} = x_{m_0,n_0,f,c}^{MIS} - x_{p,f,c}^{BACK}.$$

Consequently, at the end of the measuring step (block 83) a set of amplitude values $s_{m,n,f,c}^{amp}$ and a set of phase values $s_{m,n,f,c}^{phase}$ are obtained for each TRM (m,n). These values are then used for calculating the calibration-performance indices (block 84) and, if necessary, the new calibration coefficients (block 86).

In particular, the calibration-performance indices represent a measurement of the goodness of the calibration. On the basis of these indices, the calibration system can decide whether a new calibration cycle is necessary or not (block 85).

In detail, the calibration-performance indices comprise a performance index for the phase $K_{Rx,f,c}^{phase}$, which is the variance of the distribution of the phase values $s_{m,n,f,c}^{phase}$, and a performance index for the amplitude $K_{Rx,f,c}^{amp}$, which is the variance of the normalized distribution of the amplitude values $s_{m,n,f,c}^{amp}$. The variance of the distribution of the phase values $s_{m,n,f,c}^{phase}$, i.e., the performance index for the phase is $$K_{Rx,f,c}^{phase} = \frac{\sum_{n,m} \left(s_{m,n,f,c}^{phase} - \phi_{m,n,f,c}^{REF}\right)^2}{N_{TRM}},$$

where $\phi_{m,n,f,c}^{REF}$ is the reference phase value for the calibration of the TRM (m,n) at the frequency f of the RF-beam shape c, and $N_{TRM}$ is the total number of the TRMs of the active array 25.

As regards, instead, the variance of the normalized distribution of the amplitude values $s_{m,n,f,c}^{amp}$, the calculation is not direct. Assuming that the amplitude error is additive and is a random variable U with zero mean, the amplitude $s_{m,n,f,c}^{amp}$ can be written as $s_{m,n,f,c}^{amp} = (1+U)h_{m,n}d$ where $h_{m,n}$ is the taper of the active array 25 (by "taper" is meant the distribution of amplitude of the elements of the array such as to yield a given radiation diagram) and d is a coefficient due to the insertion amplitude of the measurement. On this hypothesis, d is estimated as $$\hat{d} = E\left\{\frac{s_{m,n,f,c}^{amp}}{h_{m,n}}\right\} = E\{(1+U)d\} = \frac{1}{N_{TRM}} \sum_{m,n} \frac{s_{m,n,f,c}^{amp}}{h_{m,n}}$$

$$\hat{\sigma}^2 = V\{U\} = E\left\{\left(\frac{s_{m,n,f,c}^{amp}}{h_{m,n}d} - 1\right)^2\right\} = \frac{1}{N_{TRM}} \sum_{m,n} \left(\frac{s_{m,n,f,c}^{amp}}{h_{m,n}\hat{d}} - 1\right)^2$$

$$K_{Rx,f,c}^{amp} = \hat{\sigma}$$

The calibration can be considered acceptable (block 85) if the following relation is true:

$(K_{Rx,f,c}^{phase} \le K_{Rx,REF}^{phase})$ AND $(K_{Rx,f,c}^{amp} \le K_{Rx,REF}^{amp})$, where $K_{Rx,REF}^{phase}$ and $K_{Rx,REF}^{amp}$ are reference performance indices, respectively, for the phase and for the amplitude.

Moreover, as has been said previously, the step of calculation of the new calibration index (block 86) comprises calculating new calibration indices on the basis of the current calibration coefficients, said new calibration coefficients comprising new attenuation coefficients $A_{m,n,f,c}^{new}$ (quantized with $N_A$ bits) and new phase coefficients $\Phi_{m,n,f,c}^{new}$ (quantized with $N_P$ bits). The new phase coefficient $\Phi_{m,n,f,c}^{new}$ applied to each TRM (m,n) is obtained from the sum of a phase-correction coefficient $\phi_{m,n,f,c}^{new}$ plus the phase necessary for pointing of the RF beam.

In particular, the "current" values of the attenuation and phase coefficients for the TRM (m, n) at the frequency f and for the RF-beam shape c are $$a_{m,n,f,c}^{old} = 10^{-\frac{A_{m,n,f,c}^{old} \cdot M}{20}};$$

$$a_{m,n,f,c}^{old} \in [0, 1]$$

$\phi_{m,n,f,c}^{old} \in [0,360)$ where $A_{m,n,f,c}^{old}$ indicates the attenuation bits (in the range $[0,2^{N_A}-1]$) associated to the previous calibration, and $\Delta A$ is the quantization step for the attenuation. For the first calibration, the "current" values of the attenuation and phase coefficients are set to the initial default values indicated below:

$$a_{m,n,f,c}^{old}=h_{m,n}$$

$$\Phi_{m,n,f,c}^{old}=0$$

The steps of the algorithm used for calculating the new calibration coefficients $A_{m,n,f,c}^{new}$ and $\Phi_{m,n,f,c}^{new}$ are described in detail hereinafter using a programming pseudo-language that can be readily understood by persons skilled in the sector.

% Start of Calculation of the Calibration Coefficients $\phi_{m,n,f,c}^{REF}$=parameter containing the desired value for the phase of each TRM (m,n) at the frequency f considered and for the RF-beam shape c considered;

$S_f^{MIN}$=minimum value allowed for the amplitude of the signal (defined on the basis of factory measurements) at the frequency f considered;

$S_f^{MAX}$=maximum desired value for the amplitude of the signal (defined on the basis of factory measurements) at the frequency f considered;

$$a^{min}=10^{-\frac{0}{20}}=1$$

minimum attenuation inserted by the TRMs;

$a^{max}$ maximum attenuation inserted by the TRMs;

for k=1:$N_{TRM}$ (where $N_{TRM}$ is the number of TRMs of the AESA antenna 2—namely, $N_{TRM}$=16×54=864—and (m,n) identify, respectively, row and column of the k-th TRM)

correction of the background signal by the p-th calibration antenna 3 that has been used for the measurement of the TRM (m,n):

$$s_{m,n,f,c}^{amp,MIS}=\sqrt{(I_{m,n,f,c}^{MIS}-I_{p,f,c}^{BACK})^2+(Q_{m,n,f,c}^{MIS}-Q_{p,f,c}^{BACK})^2};$$

and $$s_{m,n,f,c}^{phase,MIS}=\arg\{(I_{m,s,f,c}^{MIS}-I_{p,f,c}^{BACK})+j(Q_{m,n,f,c}^{MIS}-Q_{p,f,c}^{BACK})\};$$

correction linked to the position of the TRM (m,n) with respect to the p-th calibration antenna 3 that has been used for the calibration measurements on said TRM (m,n) through the parameters (contained in a predefined database) $s_{m,n,f}^{amp,p}$, which represents a correction in amplitude at the frequency f considered, and $s_{m,n,f}^{phase,p}$, which represents a correction in phase at, the frequency f considered:

$$s_{m,n,f,c}^{amp}=\frac{s_{m,n,f,c}^{amp,MIS}}{s_{m,n,f}^{amp,p}},$$

and $$s_{m,n,f,c}^{phase}=s_{m,n,f,c}^{phase,MIS}-s_{m,n,f}^{phase,p};$$

This correction enables clearing of the attenuation and phase shift due to the path in air comprised between the p-th calibration antenna 3 and the radiating element 21 associated to the TRM (m,n); in this way, $s_{m,n,f,c}^{amp}$ and $s_{m,n,f,c}^{phase}$ represent, with reference once again for a moment to FIG. 1, the amplitude insertion and phase insertion, respectively, of the reception path comprised between the port 12 and the radiating element 14;

first amplitude-calibration coefficient:

$$a_{m,n,f,c}^{prc}=\frac{a_{m,n,f,c}^{old}}{s_{m,n,f,c}^{amp}}h_{m,n}\cdot S_f^{MAX};$$

warning of failure for identifying a failed TRM:

$$FD_{m,n,f,c}^{Rx}=\begin{cases}1, & se\ \frac{s_{m,n,f,c}^{amp}}{a_{m,n,f,c}^{old}}\geq S_f^{MIN}\\ 0, & se\ \frac{s_{m,n,f,c}^{amp}}{a_{m,n,f,c}^{old}}<S_f^{MIN},\end{cases}$$

the TRMs for which we obtain $$\frac{s_{m,n,f,c}^{amp}}{a_{m,n,f,c}^{old}}<S_f^{MIN}$$

being considered as failed;

second amplitude-calibration coefficient:

$$a_{m,n,f,c}^{new}=\begin{cases}a^{min}, & se\ a_{m,n,f,c}^{pre}>a^{min}\\ a^{max}, & se\ a_{m,n,f,c}^{pre}<a^{max}\\ a_{m,n,f,c}^{pre}, & se\ a_{m,n,f,c}^{pre}\in[a^{max},a^{min}];\end{cases}$$

phase-correction coefficient:

$\phi_{m,n,f,s}^{new}=\mathrm{mod}(s_{m,n,f,c}^{phase}-\phi_{m,n,f,c}^{REF}-\phi_{m,n,f,c}^{old},360)$, where $\phi_{m,n,f,c}^{new}\in[0,360]$ and the function mod(x, y) yields as result the remainder of the integer division x/y;

new attenuation coefficient of the new calibration coefficients (including the taper of the active array 25) for the TRM (m,n) at the frequency f considered and for the RF-beam shape c considered:

$$A_{m,n,f,c}^{new}=\mathrm{mod}\left(\mathrm{round}\left(-\frac{20\log_{10}a_{m,n,f,c}^{new}}{\Delta A}\right),2^{N_A}\right),$$

where $A_{m,n,f,c}^{new}$ indicates an amplitude encoded in the range $[0,2^{N_A}-1]$ and the function round(x) yields as result x rounded off to the nearest integer;

new phase coefficient of the new calibration coefficients for the TRM (m,n) at the frequency f considered and for the RF-beam shape c considered:

$$\phi_{m,n,f,c}^{new}=\mathrm{mod}\left(\mathrm{round}\left(\frac{\phi_{m,n,f,c}^{new}}{\Delta\phi}\right),2^{N_P}\right),$$

where $\Phi_{m,n,f,c}^{new}$ is a phase encoded in the range $[0,2^{N_P}-1]$ and $$\Delta\phi=\frac{360}{2^{N_P}}$$

is me quantization step for the phase;

end of for cycle;

% End of Calculation of the Calibration Coefficients

Consequently, on the basis of what has just been described, at the end of execution of the step of calculation of the new calibration indices (block 86) we obtain:

the set of the calibration coefficients $A_{m,n,f,c}{}^{new}$ and $\Phi_{m,n,f,c}{}^{new}$ for all the TRMs at the frequency f considered and for the RF-beam shape c considered; and the set of all the parameters $FD_{m,n,f,c}{}^{Rx}$ corresponding to the failed TRMs.

The value of $\Phi_{m,n,f,c}{}^{new}$ is used directly for the subsequent calibration measurements (block 83) if necessary. Otherwise, if the calibration has been successful, the value loaded in the TRM is $$\Phi^{new}_{m,n,f,c} = \mathrm{mod}\left(\mathrm{round}\left(\frac{\phi^{new}_{m,n,f,c} + \phi^{array}_{m,n,f,c}}{\Delta\phi}\right), 2^{N_P}\right),$$

where $\phi_{m,n,f,c}{}^{array}$ is a parameter that comprises the pointing phases of the RF beam.

The value of $S_f^{MIN}$, which is the amplitude threshold used to decide whether a TRM is failed or not, must be evaluated during the factory calibration measurements.

Provided in the foregoing is a detailed description of the calibration of an AESA antenna both in terms of hardware devices necessary for making the calibration, i.e., the calibration antenna described previously and a processing and control unit that is coupled to said calibration antenna and to the AESA antenna and is configured for implementing the calibration method described previously, and in terms of algorithm implemented for making the calibration, preferably implemented by a software program run on said processing and control unit From the foregoing description the advantages of the present invention may be readily understood.

In particular, it is important to highlight the fact that since the calibration antenna according to the present invention has the radiating portion that is installed between the ground plane and the dielectric cover of the AESA antenna, it does not entail an increase of the external dimensions of the AESA antenna, unlike the calibration antennas described in US2004032365 (A1), which, instead, since they are designed for being installed and functioning only outside the dielectric cover of the AESA antenna, lead to an increase in the external dimensions of the AESA antenna.

Thanks to this technical advantage, the present invention finds a particularly advantageous application in transportable radar systems based on AESA antennas where the external dimensions of the AESA antennas must be as small as possible.

Moreover, the calibration method according to the present invention presents excellent performance in terms of accuracy of calibration, as well as computational cost and processing time necessary for performing the calibration of an AESA antenna.

Finally, it is clear that various modifications may be made to the present invention, without thereby departing from the sphere of protection of the invention defined in the annexed claims.

What is claimed is:

1. An active electronically scanned array antenna comprising:

(a) an active array, configured for radiating and receiving radiofrequency (RF) signals through first radiating openings that lie on a ground plane;

(b) a dielectric cover configured to act as both a wide-angle impedance matcher and as protection for the active electronically scanned array antenna, the dielectric cover parallel to the ground plane and spaced apart from the ground plane at a given distance to form an air gap between the dielectric cover and the ground plane; and (c) a plurality of calibration devices operable for calibrating said active electronically scanned array antenna;

(d) wherein each calibration device comprises a respective radiating portion, a respective transition portion, and a respective middle portion;

(e) wherein for each calibration device:

(1) the respective radiating portion is arranged between the dielectric cover and the ground plane, is oriented parallel to the ground plane, and comprises a respective first waveguide ending, at a first end, with a respective second radiating opening that gives out onto the air gap towards corresponding first radiating openings, is perpendicular to the ground plane, and is and configured for receiving RF signals radiated through said corresponding first radiating openings and for radiating RF signals in the air gap towards said corresponding first radiating openings;

(2) the respective transition portion is oriented perpendicularly to the respective radiating portion and comprises a respective second waveguide and a respective third waveguide cascaded thereto;

(3) the respective middle portion is curved at 90 degrees and comprises a respective fourth waveguide coupled, at one end, to the respective third waveguide and, at the other end, to a second end of the respective first waveguide;

(4) the respective first waveguide, the respective third waveguide and the respective fourth waveguide have the same given width depending on an operating frequency of the calibration device, and the same given height to enable the respective radiating portion to be arranged between the dielectric cover and the ground plane; and (5) the respective second waveguide is coupled through a respective SMA connector to a signal source to receive therefrom the radio frequency signals to be radiated, the respective second waveguide having said given width and a height greater than said given height.

2. The active electronically scanned array antenna according to claim 1, wherein each radiating portion comprises a respective inductive iris, configured for matching a radiation impedance of said radiating portion with an impedance of the respective first waveguide.

3. The active electronically scanned array antenna according to claim 1, wherein each second radiating opening has a respective direction of maximum radiation parallel to the ground plane.

4. The active electronically scanned array antenna according to claim 1, configured for radiating and receiving first polarized RF signals that have a first electric-field vector that lies in a first reference plane;

wherein each radiating portion is configured for radiating and receiving second polarized RF signals that have a second electric-field vector that lies in a second reference plane; and wherein each radiating portion is arranged between said dielectric cover and said ground plane so that said second reference plane is parallel to the first reference plane.

5. A method for calibrating the active electronically scanned array antenna of claim 1, said method comprising:

a measuring step for a given operating frequency of the active electronically scanned array antenna and for a given shape of beam that can be radiated and received by the active electronically scanned array antenna, said measuring step including making calibration measurements for the active electronically scanned array antenna that correspond to the given operating frequency and the given beam shape on the basis of signals radiated and received by the calibration device/devices; and calibrating the active electronically scanned array antenna on the basis of the calibration measurements made;

wherein the active electronically scanned array antenna comprises a plurality of transmit/receive modules (TRMs); and wherein the calibration measurements comprise an amplitude measurement and a phase measurement of each TRM.

6. The method of claim 5, and wherein making calibration measurements comprises:

receiving, via the active electronically scanned array antenna or the calibration devices, first signals radiated by the calibration devices or by the active electronically scanned array antenna, which have the given operating frequency and which form a first beam having the given beam shape;

after setting a maximum attenuation on the TRMs and after turning off said TRMs, receiving, via the active electronically scanned array antenna or the calibration devices, second signals radiated by the calibration devices or by the active electronically scanned array antenna, which have the given operating frequency and which form a second beam having the given beam shape, the second signals received indicating a background signal through the TRMs; and determining, on the basis of the first signals received and of the background signal, quantities indicating a current calibration of the active electronically scanned array antenna for the given operating frequency and the given beam shape.

7. The method of claim 6, wherein calibrating also comprises a calculation step for the given operating frequency and for the given beam shape, said calculation step including calculating performance indices of the current calibration of the active electronically scanned array antenna corresponding to the given operating frequency and the given beam shape on the basis of the quantities indicating the current calibration of the active electronically scanned array antenna determined.

8. The method of claim 7, wherein the quantities indicating the current calibration of the active electronically scanned array antenna determined comprise amplitude values and phase values, and wherein calculating performance indices of the current calibration comprises:

calculating, on the basis of the amplitude values, a performance index for the amplitude that indicates a variance of a normalized distribution of the amplitude values; and calculating, on the basis of the phase values, a performance index for the phase that indicates a variance of a distribution of the phase values.

9. The method according to claim 7, wherein calibrating further comprises:

a verification step for the given operating frequency and for the given beam shape, said verification step including verifying whether the performance indices of the current calibration calculated for the given operating frequency and for the given beam shape satisfy a given condition with respect to reference indices;

if the performance indices of the current calibration calculated for the given operating frequency and for the given beam shape do not satisfy the given condition with respect to the reference indices, calculating new calibration coefficients for the given operating frequency and for the given beam shape, setting said new calibration coefficients in the active electronically scanned array antenna and performing again the measuring step, the calculation step, and the verification step for the given operating frequency and for the given beam shape; and, if the performance indices of the current calibration calculated for the given operating frequency and for the given beam shape satisfy the given condition with respect to the reference indices, performing the measuring step, the calculation step, and the verification step for a different operating frequency or for a different beam shape.

10. A software program product comprising portions of software code that can be loaded into a memory of a processing and control unit of the active electronically scanned array antenna of claim 1, said portions of software code being executable by said processing and control unit, and being such as to cause, when run, said processing and control unit to carry out a calibration method comprising:

a measuring step for a given operating frequency of the active electronically scanned array antenna and for a given shape of beam that can be radiated and received by the active electronically scanned array antenna, said measuring step including making calibration measurements for the active electronically scanned array antenna that correspond to the given operating frequency and the given beam shape on the basis of signals radiated and received by the calibration device/devices; and calibrating the active electronically scanned array antenna on the basis of the calibration measurements made.

11. A radar system comprising the active electronically scanned array antenna claimed in claim 1.

12. An active electronically scanned array antenna comprising:

(a) an active array, configured for radiating and receiving radiofrequency (RF) signals through first radiating openings that lie on a ground plane;

(b) a dielectric cover arranged at a given distance from the ground plane so that between the dielectric cover and the ground plane an air gap is present; and (c) a plurality of calibration devices configured to calibrate the active electronically scanned array antenna, each calibration device comprising a respective radiating portion, a respective transition portion, and a respective middle portion;

(d) wherein for each calibration device:

(1) the respective radiating portion is arranged between the dielectric cover and the ground plane, is oriented parallel to the ground plane, and comprises a respective first waveguide ending, at a first end, with a respective second radiating opening that gives out onto the air gap towards corresponding first radiating openings, is perpendicular to the ground plane, and is configured for receiving RF signals radiated through the corresponding first radiating openings and for radiating RF signals in the air gap towards the corresponding first radiating openings;

(2) the respective transition portion is oriented perpendicularly to the respective radiating portion and comprises a respective second waveguide and a respective third waveguide cascaded thereto;

(3) the respective middle portion is curved at 90 degrees and comprises a respective fourth waveguide coupled, at one end, to the respective third waveguide and, at the other end, to a second end of the respective first waveguide;

(4) the respective first waveguide, the respective third waveguide and the respective fourth waveguide have the same given width and the same given height; and (5) the respective second waveguide is coupled through a respective SMA connector to a signal source to receive therefrom the radio frequency signals to be radiated, the respective second waveguide having the given width and a height greater than the given height.

* * * * *